United States Patent
Doree et al.

(10) Patent No.: US 11,513,881 B2
(45) Date of Patent: Nov. 29, 2022

(54) SYSTEM AND METHOD FOR DETECTING, MANAGING AND RELAYING A MULTIMEDIA COMMUNICATION PROBLEM AND CORRESPONDING EXECUTION, CHECKING AND RULE MANAGEMENT ENTITIES

(71) Applicant: Orange, Issy-les-Moulineaux (FR)

(72) Inventors: José Doree, Châtillon (FR); Jean-Claude Le Rouzic, Châtillon (FR)

(73) Assignee: Orange, Issy-les-Moulineaux (FR)

( * ) Notice: Subject to any disclaimer, the term of this patent is extended or adjusted under 35 U.S.C. 154(b) by 123 days.

(21) Appl. No.: 16/767,552

(22) PCT Filed: Nov. 22, 2018

(86) PCT No.: PCT/FR2018/052955
§ 371 (c)(1),
(2) Date: Mar. 9, 2021

(87) PCT Pub. No.: WO2019/106262
PCT Pub. Date: Jun. 6, 2019

(65) Prior Publication Data
US 2021/0191803 A1   Jun. 24, 2021

(30) Foreign Application Priority Data
Nov. 30, 2017  (FR) ...................................... 1761445

(51) Int. Cl.
*G06F 15/17* (2006.01)
*G06F 11/07* (2006.01)
(Continued)

(52) U.S. Cl.
CPC ...... *G06F 11/0772* (2013.01); *G06F 11/0709* (2013.01); *G06F 11/0751* (2013.01); *H04L 43/0811* (2013.01); *H04L 43/10* (2013.01)

(58) Field of Classification Search
CPC .. H04L 43/10; G06F 11/0772; G06F 11/0751; G06F 11/0811
(Continued)

(56) References Cited

U.S. PATENT DOCUMENTS

| | | | |
|---|---|---|---|
| 9,710,482 B2 * | 7/2017 | Fitzgerald | ........... G06F 9/45533 |
| 2005/0096986 A1 * | 5/2005 | Taylor | .................... G06Q 40/02 705/16 |

(Continued)

FOREIGN PATENT DOCUMENTS

| | | | | |
|---|---|---|---|---|
| CA | 2847350 A1 * | 3/2013 | ............. | G06Q 40/04 |
| CA | 2986542 A1 * | 6/2013 | ......... | G06F 19/3418 |

(Continued)

OTHER PUBLICATIONS

International Search Report dated Jan. 22, 2019 for Application No. PCT/FR2018/052955.

*Primary Examiner* — Khanh Q Dinh
(74) *Attorney, Agent, or Firm* — Knobbe, Martens, Olson & Bear, LLP (57) ABSTRACT

The invention relates to a method for detecting a multimedia communication problem. In one aspect, this is implemented by an execution entity, in a processing phase. A message(s) is received that belongs to at least one stream to be monitored relating to at least one media stream. A correspondence between the received message(s) and rule(s) associated with a stream(s) to be monitored is verified. If verified an error detection massage is sent to a checking entity separate from the execution entity, via a rule management entity.

13 Claims, 3 Drawing Sheets

(51) Int. Cl.
*H04L 43/0811* (2022.01)
*H04L 43/10* (2022.01)

(58) Field of Classification Search
USPC ............................... 709/220, 224, 227, 228
See application file for complete search history.

(56) References Cited

U.S. PATENT DOCUMENTS

| | | | | |
|---|---|---|---|---|
| 2006/0065717 A1* | 3/2006 | Hurwitz | ................ | G06Q 20/02 235/381 |
| 2007/0121596 A1* | 5/2007 | Kurapati | ............ | H04M 7/0078 370/356 |
| 2008/0134176 A1* | 6/2008 | Fitzgerald | ........... | G06F 11/0793 718/1 |
| 2008/0151764 A1* | 6/2008 | Wing | .................. | H04L 61/2575 370/248 |
| 2011/0096665 A1* | 4/2011 | McCann | ................ | H04L 47/12 370/235 |
| 2013/0205002 A1* | 8/2013 | Wang | ..................... | H04L 69/16 709/224 |
| 2014/6173085 | 6/2014 | Gupta | | |
| 2020/0218598 A1* | 7/2020 | Xu | ...................... | G06F 11/1004 |
| 2020/0334371 A1* | 10/2020 | Staler | ...................... | G06F 21/31 |
| 2021/0028987 A1* | 1/2021 | Krivenok | ............ | H04L 41/0869 |
| 2021/0306247 A1* | 9/2021 | Duan | ..................... | H04L 43/10 |

FOREIGN PATENT DOCUMENTS

| | | | | |
|---|---|---|---|---|
| EP | 2 493 139 A1 | 8/2012 | | |
| WO | WO-2021108652 A1 * | 6/2021 | ............ | H04L 41/08 |

\* cited by examiner

SYSTEM AND METHOD FOR DETECTING, MANAGING AND RELAYING A MULTIMEDIA COMMUNICATION PROBLEM AND CORRESPONDING EXECUTION, CHECKING AND RULE MANAGEMENT ENTITIES

RELATED APPLICATIONS

This application is the U.S. National Phase of Application No. PCT/FR2018/052955 entitled "METHOD FOR DETECTING, MANAGING AND RELAYING A MULTIMEDIA COMMUNICATION PROBLEM, CORRESPONDING EXECUTION, CHECKING AND RULE MANAGEMENT ENTITIES AND COMPUTER PROGRAM" and filed Nov. 22, 2018, which claims the benefit of French Patent Appellation NO. 1761445, filed Nov. 30, 2017, each of which is incorporated by reference in its entirety.

1. FIELD OF THE INVENTION

The field of the invention is that of multimedia communications within at least one communication network.

More precisely, the invention offers a solution for managing a communication problem arising during a multimedia session, also called multimedia communication problem.

The invention is applicable in particular, but not exclusively, to applications in networks using the PCC ("Policy and Charging Control") architecture, as defined by the 3GPP ("Third Generation Partnership Project"), and the IP protocol in the media plane.

2. PRIOR ART

In order to offer new services to their subscribers, telephony operators have started to deploy new communication networks for the transmission of voice over IP, such as VoLTE ("Voice over LTE") or VoWiFi ("Voice over Wi-Fi") networks.

These networks have some supervision mechanisms for limiting the duration of communications in the event of a problem, for example in the event of incorrect hanging up of a telephone handset. These mechanisms make it possible in particular to avoid overcharging clients, and to protect networks by avoiding their resources being used when a problem has occurred.

These call supervision mechanisms include session timers in the SIP protocol, as described in document RFC 4028 ("Session Timers in the Session Initiation Protocol (SIP)"), which allow SIP agents to release calls in the absence of a response to supervision messages from the signaling plane. Such SIP agents are for example of UE ("User Equipment"), x-CSCF ("x-Call/Session Control Function") or AS ("Application Server") type.

Mention may also be made of media inactivity detection mechanisms, implemented on access gateways (AGWs), which release communication if an equipment on the media plane (for example the access gateway) detects the absence of a media flow for a period of time able to be configured by the operator. It is recalled that a media flow is understood to mean in particular a flow associated with a type of media, such as an audio flow, a video flow, a flow carrying application data, a flow carrying text data, a flow carrying image data, etc.

However, there are call configurations or network architectures for which these call supervision mechanisms are not effective, or are not very effective, and could be improved.

In particular, if the terminal associated with a client is located in the network behind a network address translation (NAT/P) router and it loses its network connectivity, the NAT/P router will return "Destination Unreachable" ICMP ("Internet Control Message Protocol") messages to an equipment on the media plane. Such ICMP messages, in particular ICMP Type 3+Code 1, 2 or 3, make it possible to indicate to the equipment on the media plane that the destination that it is seeking to reach is no longer accessible. It is recalled that the ICMP protocol, as defined in document RFC 792 in particular, makes it possible to control transmission errors, by informing a sending equipment of a problem on the network. The IP protocol, for its part, only manages the transport of packets, and does not permit the sending of error messages.

However, if the client's terminal uses VoLTE or VoWiFi technology, the ICMP protocol is not authorized in the network. Specifically, as described in the TS 29.214 standard ("Universal Mobile Telecommunications System (UMTS); Policy and charging control over Rx reference point"), only flows negotiated during the phase prior to establishing communication, in accordance with the Session Description Protocol (SDP) protocol for describing sessions, are authorized in the network. However, the ICMP protocol, which is used to control transmission errors, is not negotiated in the SDP during the phase prior to establishing communication, and is therefore not authorized during the communication phase.

In the absence of authorization of the ICMP protocol with terminals using VoLTE or VoWiFi technology, ICMP messages cannot be used to detect a communication problem during the communication phase. Therefore, the communication cannot be released before either the expiry of a media inactivity timer or an audit of the signaling plane, as described in above mentioned document RFC 4028.

If it is considered that the communication is released in the next audit of the signaling plane, the release of the communication is not immediate. Specifically, in modern networks, the duration between two audits is usually of the order of one hour.

If it is considered that the communication is released upon the expiry of the media inactivity timer, the delays usually vary from a few seconds to a few minutes. However, it should be noted that such a timer is conventionally implemented only on the access gateway. However, such an access gateway is not necessarily present in the architecture that is used, and remains optional in the IMS (IP Multimedia Subsystem) architecture.

There is therefore a need for a new technique for detecting a communication problem, and which is in particular compatible with architectures implementing VoLTE or VoWiFi technology.

3. DISCLOSURE OF THE INVENTION

According to at least one embodiment, the invention proposes a method for detecting a multimedia communication problem, implemented by an execution entity.

According to the invention, such a detection method comprises a processing phase implementing:
receiving at least one message, called received message, belonging to at least one flow to be monitored relating to at least one media flow, verifying a correspondence between said at least one received message and at least one rule associated with said at least one flow to be monitored, and when said at least one received message corresponds to said rule, sending an error detection message to a control entity distinct from said execution entity, via a rule management entity.

According to the invention, what is thus defined is a set of rules allowing an execution entity to detect a multimedia communication problem on the network and to inform a control entity thereof.

The execution entity according to the invention is therefore provided with a certain intelligence, since it is able to analyze the messages that it receives and trigger an error detection message if the received messages satisfy a predefined rule.

A communication problem is thus able to be detected quickly, and an action is therefore able to be initiated (such as releasing the communication), without waiting for the media inactivity timer to expire or for the next audit of the signaling plane.

In particular, said at least one flow to be monitored is an ICMP flow, in particular an ICMP flow relating to at least one media flow.

When the flow to be monitored is an ICMP flow, the received message is an error message, for example a "Destination Unreachable" error message. In this case, the method for detecting a communication problem may in particular implement a step of identifying a media flow at the origin of the error message. The rule or rules associated with the flow to be monitored may in particular depend on the media flow at the origin of the error message.

It is thus possible to quickly determine a communication problem, for example a loss of reachability, by analyzing the ICMP messages, in particular in the context of a 3GPP PCC architecture.

For example, following the termination of an application on a client (calling terminal for example), the operating system managing the application conventionally transmits ICMP messages to the remote party (called terminal for example), the application having released network resources.

Authorizing the use of ICMP messages, in the context of the invention, thus makes it possible to identify the lack of reachability of the calling terminal (in the example under consideration).

In particular, a communication problem is able to be identified quickly following analysis of the received ICMP messages. Specifically, the transmission rate of RTP (Real-Time Transport Protocol) packets is conventionally 20 ms. A communication problem may therefore be confirmed and signaled to the control entity within a very short time. For example, a communication problem is detected if the number of ICMP packets received exceeds a configurable threshold within a time period that is also configurable. In the case of a conventional RTP flow, the reception of 10 consecutive ICMP messages makes it possible for example to confirm a connectivity problem. At the rate of 20 ms per RTP packet, the problem is confirmed in 200 ms.

According to one particular embodiment, the detection method comprises a configuration phase prior to said processing phase, implementing receiving an error detection notification request message, transmitted by said control entity via said rule management entity, said error detection notification request message carrying said at least one rule.

Thus, the set of rules allowing an execution entity to detect a multimedia communication problem on the network may be defined by the control entity, and then transmitted to the execution entity via the rule management entity.

In particular, if said at least one rule defines a threshold for detecting a communication problem based on a predetermined number of messages and a predetermined period, said error detection message is generated, and sent to said control entity, when the number of messages received during said predetermined period is greater than or equal to the predetermined number of messages.

In other words, a "threshold crossed" error detection message may be sent to the control entity.

In another embodiment, the invention relates to a corresponding execution entity, able to detect a multimedia communication problem.

Such an execution entity is in particular designed to implement the detection method described above. Such an entity may thus comprise the various features relating to the detection method according to the invention, which may be combined or taken on their own.

For example, such an execution entity is of PCEF ("Policy and Charging Enforcement Function") type, and may in particular be integrated into an access gateway.

Such an execution entity may in particular be a purely software-based entity, or a physical entity, comprising physical and/or software means.

The invention also relates, according to at least one embodiment, to a method for managing a multimedia communication problem, implemented by a control entity.

According to the invention, such a management method comprises a processing phase implementing:

receiving an error detection message, generated by an execution entity distinct from said control entity, taking into account at least one rule associated with at least one flow to be monitored relating to at least one media flow, and transmitted via a rule management entity, and acting on said communication upon receiving said error detection message.

An action may thus be triggered as soon as possible upon receiving an error detection message, i.e. without waiting for the media inactivity timer to expire or for the next audit of the signaling plane.

According to one particular embodiment, the management method comprises a configuration phase prior to said processing phase, implementing:

defining said at least one rule; and transmitting an error detection notification request message to said execution entity via said rule management entity, said error detection notification request message carrying said at least one rule.

As indicated above, the control entity may thus define a set of rules allowing an execution entity to detect a multimedia communication problem on the network, and then transmit these rules to the execution entity via the rule management entity.

In particular, said at least one rule defines a threshold for detecting a communication problem based on a predetermined number of messages received over a predetermined period.

For example, when the received messages are ICMP messages, an error detection message is triggered if 20 ICMP messages are received within a time period of one second.

According to one particular embodiment, the error detection notification request message also carries an attribute relating to at least one type of flow authorized to transport information on media flows.

For example, the error detection notification request message carries at least one attribute indicating that ICMP type 3 flows are authorized in the "uplink" direction (i.e. In the direction of the core network).

In particular, the error detection notification request message also carries an attribute relating to at least one media flow to which the flow to be monitored relates, the latter being for example an ICMP flow.

In another embodiment, the invention relates to a corresponding control entity, able to manage a multimedia communication problem.

Such a control entity is in particular designed to implement the management method described above. Such an entity may thus comprise the various features relating to the management method according to the invention, which may be combined or taken on their own.

For example, such a control entity is of AF type, in particular P-CSCF type.

Such a control entity may in particular be a purely software-based entity, or a physical entity, comprising physical and/or software means.

According to at least one embodiment, the invention also relates to a method for relaying a multimedia communication problem, implemented by a rule management entity.

According to the invention, such a relay method comprises a processing phase implementing:
receiving an error detection message, generated by an execution entity, taking into account at least one rule associated with at least one flow to be monitored relating to at least one media flow, and
transmitting said error detection message to a control entity distinct from said execution entity.

Such a relay method therefore makes it possible to format and relay the messages between a control entity and an execution entity. It is in particular designed to receive, format and return the messages generated by the detection and management methods described above, and therefore has the same advantages as these methods.

In particular, such a relay method comprises a configuration phase prior to said processing phase, implementing:
receiving an error detection notification request message transmitted by said control entity, said error detection notification request message carrying said at least one rule, and
transmitting said error detection notification request message to said execution entity.

In another embodiment, the invention relates to a corresponding rule management entity able to relay a multimedia communication problem.

Such a rule management entity is in particular designed to implement the relay method described above. Such an entity may thus comprise the various features relating to the relay method according to the invention, which may be combined or taken on their own.

For example, such a rule management entity is of PCRF ("Policy and Charging Rules Function") type.

Such a rule management entity may in particular be a purely software-based entity, or a physical entity, comprising physical and/or software means.

These control, rule management and execution entities define the 3GPP PCC architecture.

Thus, in one particular embodiment, the invention makes it possible to quickly detect a communication problem by analyzing ICMP messages in the 3GPP PCC architecture, in order to take the appropriate measures.

In another embodiment, the invention relates to one or more computer programs comprising instructions for implementing at least one method as described above when this program or these programs are executed by a processor.

In yet another embodiment, the invention relates to one or more non-removable or partially or fully removable computer-readable information media comprising instructions of one or more computer programs for executing the steps of at least one method as described above.

4. LIST OF THE FIGURES

Other features and advantages of the invention will become more clearly apparent from reading the following description of one particular embodiment, given by way of simple illustrative and non-limiting example, and the appended drawings, in which.

5. DESCRIPTION OF ONE EMBODIMENT OF THE INVENTION 5.1 General Principle

The invention lies in the context of a communication network implementing a PCC architecture comprising a control entity, a rule management entity and an execution entity.

The general principle of the invention is based on defining rules and verifying these rules in order to detect a multimedia communication problem in the communication network. Said communication may involve any endpoints, for example two subscriber terminals, or a voice server and a subscriber, or two connected machines, and so on.

Figure 1:
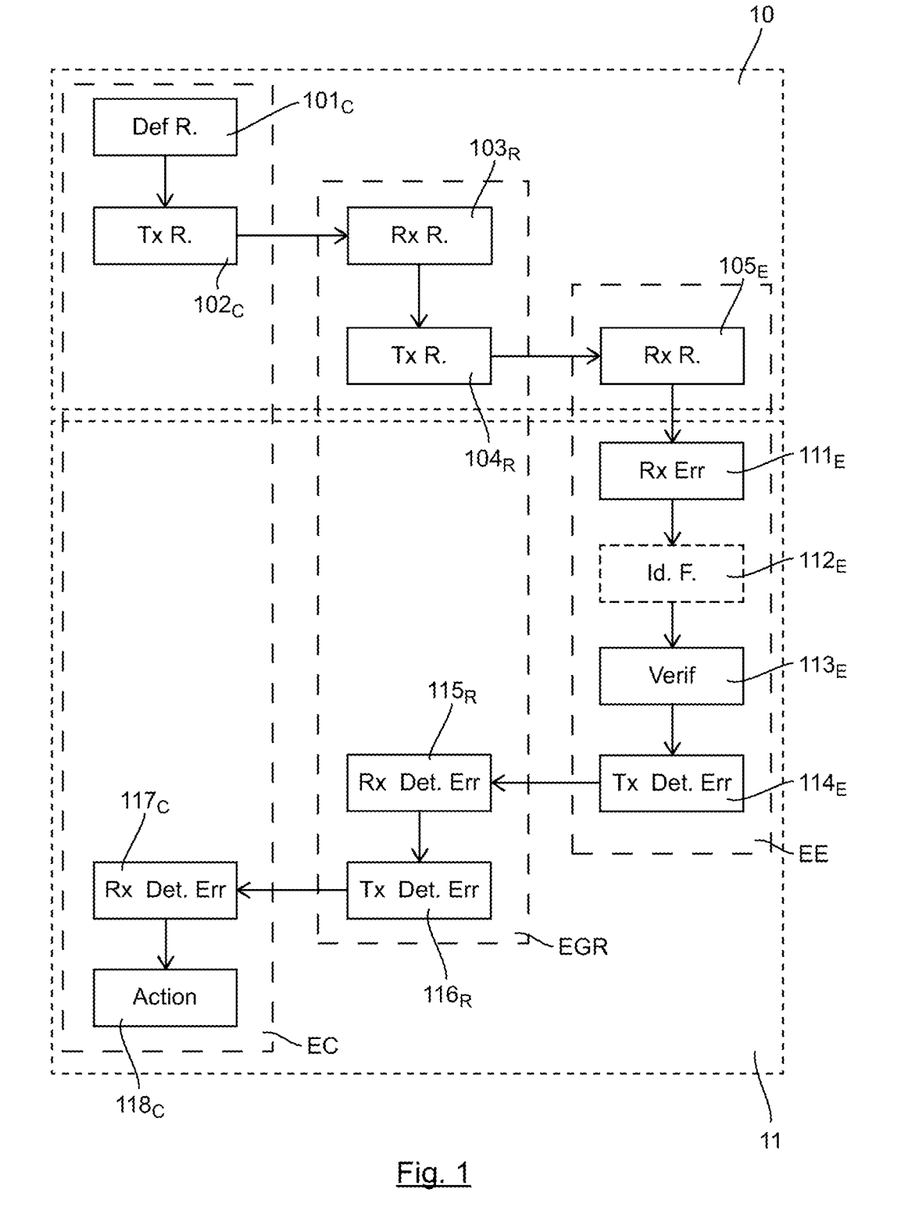
FIG. 1 illustrates the main steps implemented for detecting, relaying and managing a multimedia communication problem according to at least one embodiment.

With reference to FIG. 1, what are presented are the main steps implemented in order to detect, relay and manage a multimedia communication problem, in a communication network implementing at least a control entity EC, a rule management entity EGR, and an execution entity EE, said control entity EC and said execution entity EE being distinct entities.

During a processing phase 11, the execution entity EE receives $111_E$ at least one message belonging to a flow to be monitored. For example, the flow to be monitored is an ICMP flow and the received message is an ICMP error message (Rx Err.).

When the received message or messages are ICMP messages, the execution entity EE is able to analyze $112_E$ the received error message or messages, so as to identify the media flow or flows that caused the transmission of the error message or messages (Id. F.).

The execution entity EE then verifies $113_E$ the correspondence between the received message or messages and at least one rule associated with the flow to be monitored (Verif.). In other words, the execution entity EE verifies whether the received message or messages meet at least one condition defined by at least one rule known to the execution entity. In particular, the rule or rules associated with the flow to be monitored may depend on the media flow or flows at the origin of the error message.

The rules may in particular be defined beforehand and stored in a memory of the execution entity, or in a database accessible to the execution entity. The rules may also be defined by the control entity during a preliminary configuration phase 10, which is presented below.

When the received message or messages correspond to the rule, the execution entity EE sends $114_E$ an error detection message (Tx Det. Err.) to the rule management entity EGR.

The rule management entity EGR therefore receives $115_R$ the error detection message, generated by the execution entity EE taking into account at least one rule associated with the flow to be monitored (Rx. Det. Err).

The rule management entity EGR formats the error detection message and transmits it $116_R$ to the control entity EC (Tx. Det. Err.).

The control entity EC therefore receives $117_C$ the error detection message, initially generated by the execution entity EE taking into account at least one rule associated with the flow to be monitored and transmitted via the rule management entity EGR (Rx. Det. Err.).

Upon receiving this error detection message, the control entity is able to act $118_C$ on the multimedia communication by performing at least one action belonging to the group comprising:
  interrupting the communication,
  transmitting a specific message,
  emitting an alarm,
  modifying at least one statistical counter,
  inserting information into a charging data record (CDR), etc.

Therefore, as soon as a message of a flow to be monitored is received by the execution entity EE, it is possible for the control entity EC to act quickly on the multimedia communication.

As indicated above, the rules that the execution entity should apply may be defined by the control entity during a preliminary configuration phase 10.

More precisely, during such a configuration phase 10, implemented prior to the processing phase 11, the operator of the communication network defines $101_C$, via its control entity EC, at least one rule associated with at least one flow to be monitored (Def. R.), and possibly with at least one media flow.

The control entity EC then transmits $102_C$ an error detection notification request message to the rule management entity EGR (Tx R.). Such an error detection notification request message carries the previously defined rule or rules.

The rule management entity EGR therefore receives $103_R$ the error detection notification request message (Rx R.).

The rule management entity EGR formats the error detection notification request message and transmits it $104_R$ to the execution entity EE (Tx R.).

The execution entity EE therefore receives $105_E$ the error detection notification request message carrying the previously defined rule or rules, transmitted by the control entity EC via the rule management entity EGR (Rx R.).

5.2 Description of One Particular Embodiment

A more detailed description is given below of one exemplary implementation of the invention in a communication network implementing an AF or P-CSCF control entity, a PCRF rule management entity, and a PCEF execution entity integrated into an access gateway GW.

Figure 2:
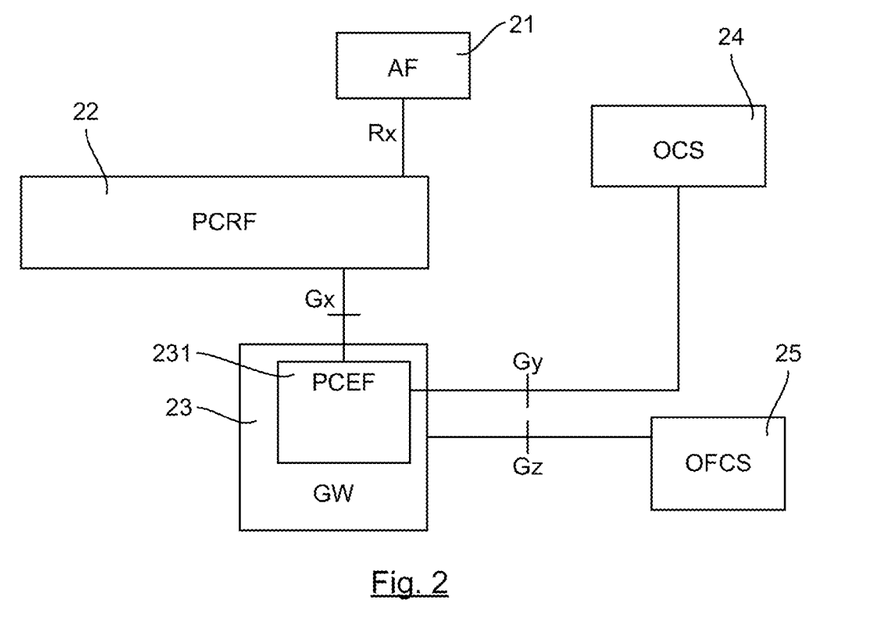
FIG. 2 illustrates one exemplary implementation of the invention in a communication network implementing a PCC architecture according to at least one embodiment.

The structure of such a network is illustrated in FIG. 2.

More precisely, such a communication network comprises an AF control entity 21 communicating with a PCRF rule management entity 22 via an interface Rx, and a PCEF execution entity 231, integrated into a gateway GW 23, communicating with the PCRF rule management entity 22 via an interface Gx. The PCEF entity 231 also communicates with an OCS ("Online Charging System") system 24 via an interface Gy, and with an OFCS ("Offline Charging System") system 25 via an interface Gz.

According to this embodiment, in order to quickly detect a multimedia communication problem, the AF control entity 21 authorizes the PCEF execution entity 231 to analyze ICMP messages.

It is recalled that, according to the prior art, such ICMP messages received during a communication phase are directly discarded by the PCEF execution entity 231 because they are not negotiated in the SDP protocol during the phase of establishing the communication. In particular, according to the prior art, the control entity (which in particular controls the execution entity) does not give any instruction to the execution entity as regards the processing of the received ICMP messages.

In particular, the AF control entity 21 authorizes "Destination Unreachable" ICMP messages according to this embodiment. Other types of ICMP messages, in particular "Ping" messages, may exhibit security flaws and therefore remain unauthorized.

In addition, according to this embodiment, the AF control entity 21, PCRF rule management entity 22, and PCEF execution entity 231 authorize the definition and the communication of rules for detecting a multimedia communication problem, for example when a detection threshold is exceeded, in order to quickly detect a multimedia communication problem.

Thus, according to this embodiment, the invention proposes to modify the operation of the AF control entity 21, as currently described in TS 29.214 standard, in order to authorize the ICMP protocol in the description of media flows, to allow a problem detection threshold to be configured based on a set of rules, and to make it possible to notify signaling of crossing of the threshold, i.e. to generate an error detection message.

According to this embodiment, the invention also proposes to modify the operation of the PCRF rule management entity 22 in order to relay the ICMP authorization information, to relay the configuration of the problem detection threshold and to request notification thereof from the PCEF execution entity 231, and then relay the notifications associated with the crossing of the threshold.

Finally, according to this embodiment, the invention proposes to modify the operation of the PCEF execution entity 231 in order to install the corresponding rules, take into account the received problem detection threshold, and notify the crossing of the threshold.

It is noted that the entity that monitors the exceedance of the threshold is preferably the PCEF execution entity 231. Specifically, it is this that manages the media flows; ICMP flows may therefore also be managed by the PCEF. Thus, upon receiving an ICMP error message, in particular a "Destination Unreachable" error message, the PCEF execution entity 231 is able to identify the media flow that caused the ICMP error message, and obtain the associated rules.

Figure 3:
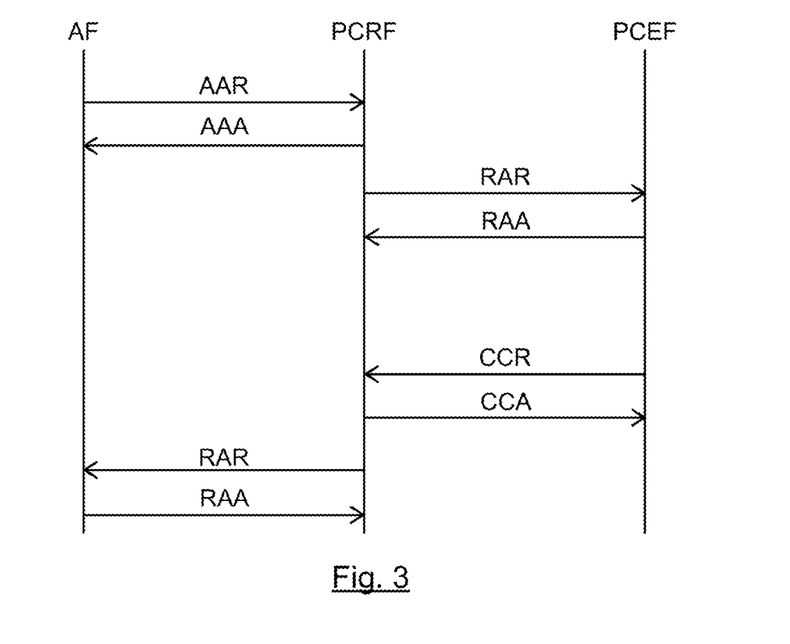
FIG. 3 shows a timing diagram illustrating the messages exchanged between the various entities of the communication network according to FIG. 2.

In order to illustrate the invention, what is presented with reference to FIG. 3 is a timing diagram illustrating the detection, relaying and management of a multimedia communication problem in a network such as the one illustrated in FIG. 2. More precisely, FIG. 3 illustrates the messages exchanged using the DIAMETER protocol, as described in the TS 29.211 standard.

By way of example, it is considered that the threshold for detecting a problem for a given type of media is available on the AF control entity 21. For example, the AF control entity is the P-CSCF, on which a condition has been configured whereby, for RTP flows associated with a certain type of media (for example audio or video or text), the reception of 20 "Destination Unreachable" ICMP messages within a time period of 1 second is characteristic of a loss of connectivity. A rule associated with ICMP flows is thus defined at the control entity, according to which rule, if the number of ICMP messages relating to RTP media flows of the type under consideration over a period of 1 second is greater than or equal to 20, a threshold exceedance notification should be transmitted.

During a configuration phase, implemented in a phase prior to the establishment of multimedia communication or when the multimedia communication is established, the AF control entity 21 indicates to the PCRF rule management entity 22, via the interface Rx, that it wishes to be notified regarding the exceedance of this detection threshold.

To this end, as indicated above, the AF control entity 21 has new functionalities allowing it in particular to transmit an error detection notification request message (i.e. for threshold exceedance notification in this example) to the PCEF execution entity 231 via the PCRF rule management entity 22.

For example, the AF control entity 21 sends an AAR ("Authorize/Authenticate-Request") error detection notification request message to the PCRF rule management entity 22, in the following form:
AAR(Specific-Action="THRESHOLD_REPORT"
  Flow-Description=ICMP type 3 filter,
  Flow-Number=X
  Flow-Packet-Threshold=(Flow-Number=X, Observation-Period=1000 ms, Packet-Count=20)

The AAR message also carries a new AVP attribute, denoted "Flow-Packet-Threshold" AVP, defining the value of the detection threshold for a flow to be monitored.

For example, the "Flow-Packet-Threshold" AVP is of "grouped" type and is defined as follows:
  Flow-Packet-Threshold::=<AVP Header: xxx>
    [Flow-Number]
    [Observation-Period]
    [Pocket-Count]
where the "Flow-Number" AVP refers here to the monitored flow (for example an ICMP flow), the "Observation-Period" AVP defines the duration of a measurement interval, for example 1 second, and the "Packet-Count" AVP defines the maximum number of packets received during this interval, for example 20 ICMP packets relating to a certain media flow.

It is noted that the AAR error detection notification request message, for example within the "Flow-Packet-Threshold" AVP, may also carry an AVP attribute for identifying a type of media (for example via a flow number) to which the ICMP flow to be monitored should relate. In the absence of such an attribute, ICMP flows relating to any type of media are monitored.

Upon reception of the AAR error detection notification request message by the PCRF rule management entity 22, the latter may acknowledge receipt by sending an AAA ("Authorize/Authenticate-Answer") message to the AF control entity 21.

The PCRF rule management entity 22 is responsible for relaying the requested detection policy to the PCEF execution entity 231. The PCEF execution entity 231 is for its part responsible for applying the requested detection policy.

To this end, the PCRF rule management entity 22 formats the AAA error detection notification request message and sends it to the PCEF execution entity 231 in the form of an RAR ("Re-Auth-Request") error detection notification request message, for example:

```
RAR  (Event-Trigger = "THRESHOLD_REPORT"
      Flow-Description = filter ICMP type 3,
      Flow-Number = X
      Flow-Packet-Threshold = (Flow-Number = X, Observation-Period = 1000 ms,
      Packet-Count = 20)
      )
```

In particular, such an AAR message carries the rule or rules defined previously, and in particular information on the detection threshold beyond which the control entity should be notified of a communication problem.

For example, the AAR message carries an AVP ("Attribute Value Pair") attribute relating to a specific action of requesting notification in the event of a detection threshold being exceeded, denoted "THRESHOLD_REPORT".

The AAR message also carries an AVP attribute relating to at least one type of flow authorized for transporting information on media flows, in the form of a flow description AVP, denoted "Flow Description" AVP. The AAR error detection notification request message thus comprises an attribute for authorizing ICMP type 3 flows during the communication of media session information, in particular in the uplink direction (i.e. in the direction of the core network).

This "Flow-Description" AVP associated with the ICMP flow may be supplemented by a media identifier, for example a flow number AVP, denoted "Flow-Number" AVP.

Thus, by virtue of using the "Flow-Description" AVP, the PCEF execution entity 231 is informed of the authorization to receive and analyze said ICMP flows.

Likewise, the "Flow-Packet-Threshold" AVP is added to the appropriate PCC rules (for example to the "Charging Rule Install" AVP), and transmitted to the PCEF execution entity 231.

Finally, the new value "THRESHOLD_REPORT" is defined for the "Event-Trigger" AVP, in association with the "Flow-Packet-Threshold" AVP, which contain the "Flow-Number" identifier of the flow or flows to be monitored.

Upon reception of the RAR error detection notification request message by the PCEF execution entity 231, the latter may acknowledge receipt by sending a RAA ("Re-Auth-Answer") message to the PCRF rule management entity 22.

The PCEF execution entity 231 installs the rules defined in the RAR error detection notification request message, in particular the filtering rules. It also takes into account content of the "Flow-Packet-Threshold" AVP in order to determine the flows to be monitored and the detection threshold values.

During a processing phase, implemented when the multimedia communication is established, the PCEF execution entity 231 monitors the flow or flows identified in the RAR error detection notification request message, for example the ICMP type 3 flow.

When an ICMP error message is received, the PCEF execution entity 231 analyzes the content thereof. In particular, the PCEF execution entity 231 (or possibly the TDF "Traffic Detection Function" function, equivalent to the DPI "Deep Packet Inspection" function) analyzes the content of the "Internet header" field of the ICMP message, in order to identify the message that generated the ICMP error, and thus to attach this error to the corresponding media flow. This identification is based for example on analyzing the "Destination IP" and/or "Destination Port UDP" fields contained in the "Internet Header" field of the ICMP type 3 message, as defined in abovementioned document RFC 792.

When the received ICMP error message or messages satisfy a rule defined during the configuration phase, for example the rule associated with audio RTP media flows and according to which if the number of ICMP messages associated with audio RTP media flows over a period of 1 second is greater than or equal to 20, a threshold exceedance notification is transmitted.

In other words, if, during the "Observation-Period" period, the number of received ICMP packets associated with audio RTP media flows is at least equal to "Packet-Count", the specific action "THRESHOLD REPORT" is transmitted from the PCEF execution entity 231 to the PCRF rule management entity 22, which in turn transfers it to the AF control entity 21.

More precisely, if the number of ICMP packets received during the observation period reaches the threshold defined for audio RTP media flows, the PCEF execution entity 231 transmits a CCR ("Credit-Control-Request") error detection message to the PCRF rule management entity 22, specifying that this is the "THRESHOLD_REPORT" Event-Trigger event for the monitored ICMP flow.

For example, the CCR error detection message takes the following form:
CCR (Event-Trigger="THRESHOLD_REPORT"
Threshold-Monitored-Flows=X
Flow-Number=Y)
where the "Threshold-Monitored-Flows" AVP makes it possible to identify the monitored flow (ICMP) and the "Flow-Number" AVP makes it possible to identify the type of media that generated the threshold exceedance (audio flow in the above example).

For example, the "Threshold-Monitored-Flows" AVP is of "Grouped" type, and defined as follows:
Threshold-Monitored-Flows::=<AVP Header: xxx>
  [Flow-Number]

It is then possible to end the observation for this ICMP flow. As a variant, monitoring is maintained for as long as a stop condition is not met.

Upon reception of the CCR error detection message by the PCRF rule management entity 22, the latter may acknowledge receipt by sending a CCA ("Credit-Control-Answer") message to the PCEF execution entity 231.

When the PCRF rule management entity 22 receives the CCR error detection message, and in particular the "Event-Trigger" AVP containing the value "THRESHOLD_REPORT", from the PCEF execution entity 231, the PCRF rule management entity 22 provides the information to the AF control entity 21.

To this end, the PCRF rule management entity 22 formats the CCR error detection message and sends it to the AF control entity 21 in the form of an RAR error detection message, for example:
RAR (Specific-Action="THRESHOLD_REPORT"
Threshold-Monitored-Flows=X
Flow-Number=Y)

The AF control entity 21 thus receives an RAR error detection message carrying the specific action AVP "THRESHOLD_REPORT" and possibly the AVP identifying the monitored flow that led to the transmission of an error detection message ("Threshold-Monitored-Flows" AVP).

Upon reception of the RAR error detection message by the AF control entity 21, the latter may acknowledge receipt by sending an RAA message to the PCRF rule management entity 22.

The AF control entity 21 may then initiate an action on the multimedia communication, for example immediately stopping the communication, transmitting an appropriate control message, and/or emitting an operator alarm, and/or modifying statistical counters, and/or inserting information into a charging data record, etc.

This thus gives a new mechanism for detecting a communication problem, compatible with equipment using VoLTE or VoWiFi technology.

5.3 Structures

Figure 4:
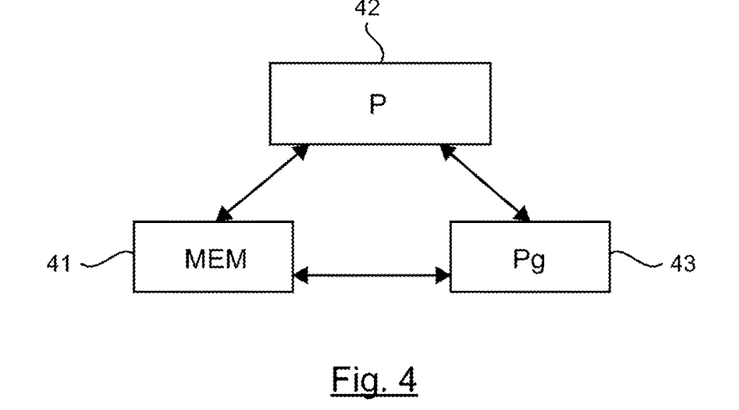
FIGS. 4 to 6 respectively show the simplified structure of an execution entity, of a control entity and of a rule management entity according to at least one embodiment.
Figure 5:
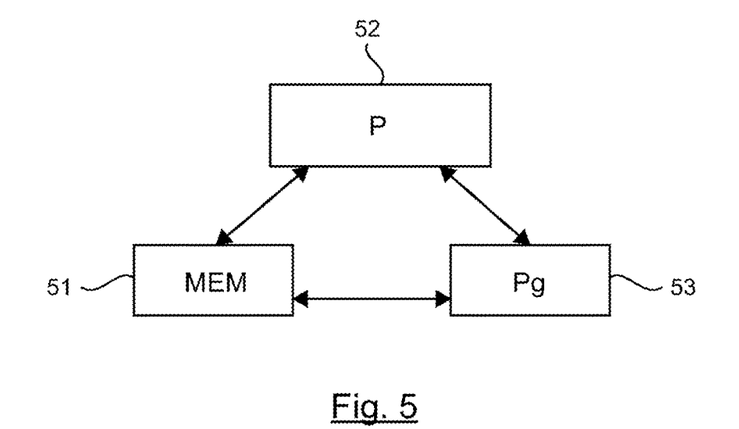
Figure 6:
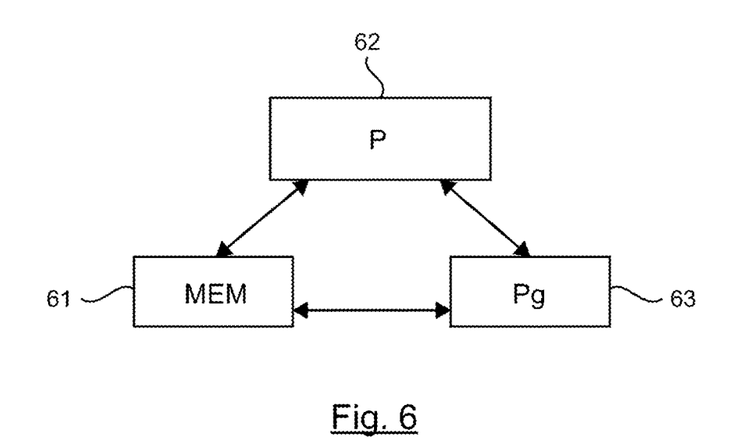

Finally, with reference to FIGS. 4 to 6, what are presented are the simplified structures of an execution entity, of a control entity and of a rule management entity according to one of the embodiments described above. As a variant, these three entities are purely software-based entities.

As illustrated in FIG. 4, an execution entity comprises a memory 41 comprising a buffer memory, a processing unit 42, equipped for example with a reprogrammable computing machine or with a dedicated computing machine, for example a processor P, and driven by the computer program 43, implementing the method for detecting a multimedia communication problem according to one embodiment of the invention.

On initialization, the code instructions of the computer program 43 are for example loaded into a RAM memory, before being executed by the processor of the processing unit 42. The processing unit 42 receives, at input, at least one message belonging to at least one flow to be monitored.

The processor of the processing unit 42 implements the steps of the method for detecting a multimedia communication problem described above, according to the instructions of the computer program 43, in order to generate an error detection message if the received message or messages correspond to a previously defined rule.

As illustrated in FIG. 5, a control entity comprises a memory 51 comprising a buffer memory, a processing unit 52, equipped for example with a reprogrammable computing machine or with a dedicated computing machine, for example a processor P, and driven by the computer program 53, implementing the method for managing a multimedia communication problem according to one embodiment of the invention.

On initialization, the code instructions of the computer program 53 are for example loaded into a RAM memory, before being executed by the processor of the processing unit 52. The processing unit 52 receives, at input, at least one error detection message.

The processor of the processing unit 52 implements the steps of the method for managing a multimedia communication problem described above, according to the instructions of the computer program 53, in order to initiate a specific action, such as interrupting the communication, if an error detection message is received.

Finally, as illustrated in FIG. 6, a rule management entity comprises a memory 61 comprising a buffer memory, a processing unit 62, equipped for example with a reprogrammable computing machine or with a dedicated computing machine, for example a processor P, and driven by the computer program 63, implementing the method for relaying a multimedia communication problem according to one embodiment of the invention.

On initialization, the code instructions of the computer program 63 are for example loaded into a RAM memory, before being executed by the processor of the processing unit 62. The processing unit 62 receives, at input, an error detection message.

The processor of the processing unit 62 implements the steps of the method for relaying a multimedia communication problem described above, according to the instructions of the computer program 63, in order to relay the error detection message to the control entity.

The invention claimed is:

1. A method of detecting a multimedia communication problem, implemented by an execution entity, the method comprising:
   receiving at least one message belonging to at least one flow to be monitored relating to at least one media flow;
   verifying a correspondence between the at least one received message and at least one rule associated with the at least one flow to be monitored; and
   when the at least one received message corresponds to the rule, sending an error detection message to a control entity distinct from the execution entity, via a rule management entity,
   wherein the receiving, verifying and sending form a processing phase and the method further comprises a configuration phase prior to the processing phase, implementing receiving an error detection notification request message, transmitted by the control entity via the rule management entity, the error detection notification request message containing the at least one rule and an attribute relating to at least one type of flow authorized to transport information on media flows.

2. The method of claim 1, wherein the at least one rule defining a threshold for detecting a communication problem is based on a predetermined number of messages and a predetermined period, the error detection message is generated, and sent to the control entity, when the number of messages received during the predetermined period is greater than or equal to the predetermined number of messages.

3. The method of claim 1, wherein the at least one flow to be monitored is an ICMP flow.

4. A method of managing a multimedia communication problem, the method comprising:
   receiving an error detection message, generated by an execution entity distinct from a control entity, based on at least one rule associated with at least one flow to be monitored relating to at least one media flow, and transmitted via a rule management entity; and
   acting on the communication upon receipt of the error detection message;
   a configuration phase prior to the receiving, comprising:
   defining the at least one rule; and
   transmitting an error detection notification request message to the execution entity via the rule management entity, the error detection notification request message containing the at least one rule and an attribute relating to at least one type of flow authorized to transport information on media flows.

5. The method of claim 4, wherein the action is one of:
   interrupting the communication,
   transmitting a specific message,
   emitting an alarm,
   modifying at least one statistical counter, and
   inserting information in a charging data record.

6. The method of claim 4, wherein the at least one rule defines a threshold for detecting a communication problem based on a predetermined number of messages received over a predetermined period.

7. A method of relaying a multimedia communication problem the method comprising:
   receiving an error detection message, generated by an execution entity, based on at least one rule associated with at least one flow to be monitored relating to at least one media flow;
   transmitting the error detection message to a control entity distinct from the execution entity;
   the method further comprising a configuration phase prior to the receiving, comprising:
   receiving an error detection notification request message transmitted by the control entity, the error detection notification request message containing the at least one rule and an attribute relating to at least one type of flow authorized to transport information on media flows; and
   transmitting the error detection notification request message to the execution entity.

8. A system for detecting a multimedia communication problem comprising a processor, a memory and an execution entity configured to detect a multimedia communication problem, the execution entity comprising:
   a module configured to receive at least one message belonging to at least one flow to be monitored relating to at least one media flow;
   a module configured to verify a correspondence between the at least one received message and at least one rule associated with the at least one flow to be monitored;
   a module configured to send an error detection message to a control entity distinct from the execution entity, via a rule management entity, when the at least one received message corresponds to the rule; and
   a module configured to receive an error detection notification request message to the execution entity via the rule management entity, the error detection notification request message containing the at least one rule and an attribute relating to at least one type of flow authorized to transport information on media flows.

9. A system for managing a multimedia communication problem comprising a processor, a memory and a control entity configured to manage a multimedia communication problem, the control entity comprising:
   a module configured to receive an error detection message, generated by an execution entity distinct from the control entity, taking into account at least one rule associated with at least one flow to be monitored relating to at least one media flow, and transmitted via a rule management entity;
   a module configured to act on the communication upon receiving the error detection message; and
   a module configured to transmit an error detection notification request message to the execution entity via the rule management entity, the error detection notification request message containing the at least one rule and an attribute relating to at least one type of flow authorized to transport information on media flows.

10. A system for relaying a multimedia communication problem comprising a processor, a memory and a rule management entity configured to relay a multimedia communication problem, the role management entity comprising:
- a module configured to receive an error detection message, generated by an execution entity, taking into account at least one rule associated with at least one flow to be monitored relating to at least one media flow and an attribute relating to at least one type of flow authorized to transport information on media flows;
- a module configured to transmit the error detection message to a control entity distinct from the execution entity;
- a module configured to receive an error detection notification request message, transmitted by the control entity, the error detection notification request message containing the at least one rule and the attribute; and
- a module configured to transmit the error detection notification request message to the execution entity.

11. A non-transitory computer readable storage medium storing a set of instructions which, when executed by a processor, cause the processor to implement the method of claim 1.

12. The method of claim 1,
wherein the at least one rule defining a threshold for detecting a communication problem is based on a predetermined number of messages and a predetermined period, the error detection message is generated, and sent to the control entity, when the number of messages received during the predetermined period is greater than or equal to the predetermined number of messages; and
wherein the at least one flow to be monitored is an ICMP flow.

13. A telecommunications system for detecting, managing and relaying a multimedia communication problem, comprising:
- an execution entity configured to receive and verify a message in a data flow to be monitored;
- a control entity configured to receive and act on an error detection message; and
- a rule management entity configured to apply rules to the message received from the execution entity and generate the error detection message;
- wherein the system is configured to receive an error detection notification request message, transmitted by the control entity, the error detection notification request message containing at least one rule and an attribute relating to at least one type of flow authorized to transport information on media flows, and is further configured to transmit the error detection notification request message to the execution entity.

* * * * *